United States Patent [19]
Carlton et al.

[11] Patent Number: 5,321,394
[45] Date of Patent: Jun. 14, 1994

[54] SPARE CARD CONNECTION CIRCUITRY FOR HIGH-SPEED TELECOMMUNICATIONS TRANSMITTERS/RECEIVERS AND METHODS

[75] Inventors: Stephen C. Carlton; Paul A. Elias, both of Plano, Tex.

[73] Assignee: Alcatel Network Systems, Inc., Richardson, Tex.

[21] Appl. No.: 867,267

[22] Filed: Apr. 10, 1992

[51] Int. Cl.⁵ .................. H04L 12/50; H04J 15/00; G06F 11/20
[52] U.S. Cl. ............... 340/825.01; 340/825.03; 370/16; 371/8.1
[58] Field of Search ............. 340/825.01, 825.02, 340/825.03, 825.79, 826, 827, 825.8, 825.16; 455/8; 370/15, 16, 79; 379/2, 5, 273, 279; 333/101; 343/876; 359/135, 110, 112, 115, 135; 371/8.1, 8.2, 11.1, 11.2, 20.5

[56] References Cited

U.S. PATENT DOCUMENTS

| | | | |
|---|---|---|---|
| 3,694,775 | 9/1972 | Rogers | 333/101 |
| 4,451,708 | 5/1984 | Kemler et al. | 379/2 |
| 4,517,572 | 5/1985 | Dixon | 333/101 |
| 4,774,703 | 9/1988 | Force et al. | 371/8.2 |
| 5,040,170 | 8/1991 | Upp et al. | 359/135 |
| 5,229,990 | 7/1993 | Teraslinna | 340/825.8 |

Primary Examiner—Donald J. Yusko
Assistant Examiner—Mark H. Rinehart
Attorney, Agent, or Firm—Baker & Botts

[57] ABSTRACT

High speed telecommunications interface circuitry (10) receives a plurality of incoming telecommunication channels (11), and includes a plurality of working receivers (88) each having an input (83-85) connected to a respective one of the incoming channels (11). A switching circuit (21) has a plurality of working circuit ports (112-116) each connected to an input (83-85) of a respective one of the working receivers (88). The switching circuit has a spare circuit port (33), and is operable to create a data path between the selected one of the working circuit ports (112-116) and the spare circuit port (33). A spare receiver (88) has an input (128) connected to the spare circuit port (33) of the switching circuit (21). Preferably, a switch card (21) of the switching circuit also includes a plurality of series-connected switches (254-268) which are operable to create a single switching path from a selected one of a plurality of working circuit output ports on the switch card (21) to a spare circuit port (36).

15 Claims, 5 Drawing Sheets

SPARE CARD CONNECTION CIRCUITRY FOR HIGH-SPEED TELECOMMUNICATIONS TRANSMITTERS/RECEIVERS AND METHODS

TECHNICAL FIELD OF THE INVENTION

The present invention relates in general to high-speed telecommunications circuitry, and more particularly to spare transmitter/receiver card connection circuitry and methods.

BACKGROUND OF THE INVENTION

The bit rate of high speed telecommunications transmission systems, such as those which use the DS3 or STS protocols, are sufficiently high (e.g. 45 and 51 Megahertz) that less than ohmic couplings of the transmission lines seriously degrade the data. For bit rates of this order of magnitude, transmission line stubs having lengths on the order of inches also have this effect.

Transmission systems that take in DS3 or STS signals in large numbers often employ a 1-for-n protection scheme, whereby n working transmission/receiver interface cards are protected by a single spare interface card. More generally, there exist m-for-n protection schemes wherein m spare interface cards protect n interface cards. A spare card is used in the event of a failure of one of the n interface cards.

Incoming and outgoing signals can be routed to the spare card in a variety of ways. According to one conventional system, the signals are passed first to a switch card which can then either route the signals to the working interface cards or to the spare card. The problem with this approach is that if the switch card is removed from the system, the paths to both the working and spare cards are broken, and the signals are lost. Some systems attempt to employ special connectors which, when the card is removed, connect the signal paths. Unfortunately, such connectors have proven to be unreliable in service.

In an attempt to solve this problem, signal splitters have been used on the input side to receive the incoming signal and pass the signals from the splitters to both the working interface cards and the switch card. With this scheme, the switch card can be removed without losing the signal to the working card. The problem then becomes the failure of the signal path when the splitter card fails. Another approach to this problem is to distribute the function of the switch card among the working interface cards. This can be complex, may again require unreliable shorting connectors, and may pose difficulties in maintaining the integrity of high-speed signals when they pass through several connectors. These conventional methods also require a large number of switching events or "switches". Purchasers o f high-speed telecommunication systems judge the reliability of these systems by the number of switches which are made. A need therefore exists to develop a spare card protection scheme which minimizes the number of switching events and better maintains the signal path and the data of the signal.

SUMMARY OF THE INVENTION

To solve this need, a switch card has been provided which is interposed between the working cards and a spare card. A first set of ports of the switch card are connected to respective signal inputs of the working cards, which are also connected to the incoming transmission line. Another port of the switch card is connected to the input of the spare card. The switch card is operable to connect the spare card to a set of channels of the transmission line that are connected to a malfunctioning one of the working cards.

According to one aspect of the invention, interface circuitry is provided for receiving a plurality of incoming telecommunications channels. The circuitry includes a plurality of working receivers, each having an input connected to a respective one of the incoming channels. A switching circuit has a plurality of working circuit ports each connected to an input of a respective one of the working receivers. The switching circuit also has a spare circuit port. The switching circuit is operable to create a data path between a selected one of the working circuit ports and the spare circuit port of the switching circuit. A spare receiver is provided that has its input connected to the spare circuit port of the switching circuit. In this way, the switching circuit is operable to substitute the spare receiver for a non-operational working receiver.

According to another aspect of the invention, a termination resistor is provided for each of the receivers, together with a resistor switch. The resistor switch is operable to connect the termination resistor to the input of that receiver. In order for a working or spare receiver to receive the data, the termination resistor switch is closed. When it is desired to take one of the working receivers out of service, the termination resistor switch of that receiver is opened and the spare card termination resistor switch is closed, thereby effectively substituting the spare receiver for the working receiver.

According to another aspect of the invention, a plurality of channels connect the inputs of the working receivers to the working circuit ports of the switching circuit. A respective resistive termination is connected to each of the working circuit ports of the switching circuit. This effectively terminates each of the incoming transmission line channels with a resistive termination and reduces problems associated wit transmission line stubs. It also obviates the requirement of having an on-board termination resistor and resistor switch. In this embodiment, the switching circuit is operable to create a data path from the working circuit ports to the spare circuit port.

According to a further aspect of the invention, telecommunication signal transmitting circuitry includes a plurality of working transmitters each having a transmitter circuit, a transmitter output connected to a respective one of a plurality of outgoing lines, and a normally closed switch operable to connect the transmitter output to the transmitter circuit. A switching circuit of the transmitting circuitry has a plurality of working circuit ports connected to respective ones of the transmitter outputs of the working transmitters. The switching circuit is operable to connect a selected one of the working circuit ports to a spare circuit port of the switching circuit. A spare transmitter has a transmitter circuit, a transmitter output and a normally open switch operable to connect the transmitter circuit of the spare transmitter to the transmitter output thereof. The transmitter output of the spare transmitter is connected to the spare circuit port of the switching circuit.

In yet another aspect of the invention, the switching circuit of the above-described transmitting circuitry includes, for each of the working circuit ports, a respective switch having an input terminal, an external output terminal and a series output terminal. These switches are connected in series, such that the series output terminal of any except the last switch is connected to the input terminal of the next switch. The external output terminal of the switch is connected to a respective working circuit port of the switching circuit. The input terminal of the first switch in the series of switches is selectively coupled to the spare circuit port of the switching circuit. The switching circuit is operable to select one of the working transmitters by connecting the input terminal of a corresponding one of the series switches to an external output terminal thereof. For the remaining non-selected transmitters, the corresponding switches have their input terminals connected to their series output terminals.

The present invention has several technical advantages. First, a spare interface card, which typically includes both the receiver and transmitter circuits, may be substituted for a working interface card without undue disturbance of the signal paths for the remaining working cards. Further, the number of switching events in making the substitution is minimized. Also, by using the series switch arrangement according to the invention on the switching card, no switching events or "hits" take place which might otherwise affect the integrity of the remaining transmitting communications channels.

The invention confers two additional technical advantages. First, selection of the spare transmitter for output produces a signal with a fidelity equal to that of a normally working transmitter. Second, on the input side, the spare receiver's input fidelity is guaranteed to be no better than the fidelity experienced at the input of the normally working receiver for which the spare receiver has been substituted. This is important because, in determining whether a signal should be protected, monitoring circuitry compares the signal at the spare receiver to the signal at the working receiver. Where the signal at the spare receiver is made to be normally no better than that attained at the working receiver, a false switching condition will be avoided. On the other hand, if the spare receiver's signal is sensed to be significantly better than the working receiver's signal, circuitry according to the invention will sense a legitimate switching condition and the incoming signal will be protected.

BRIEF DESCRIPTION OF THE DRAWINGS

Further aspects of the invention and their advantages may be discerned by reference to the following detailed description when taken in conjunction with the drawings, in which like characters identify like parts and in which.

DETAILED DESCRIPTION OF THE INVENTION

The present invention and its advantages are best understood by referring to FIGS. 1-5 of the drawings, like numerals being used for like and corresponding parts of the various drawings.

Figure 1:
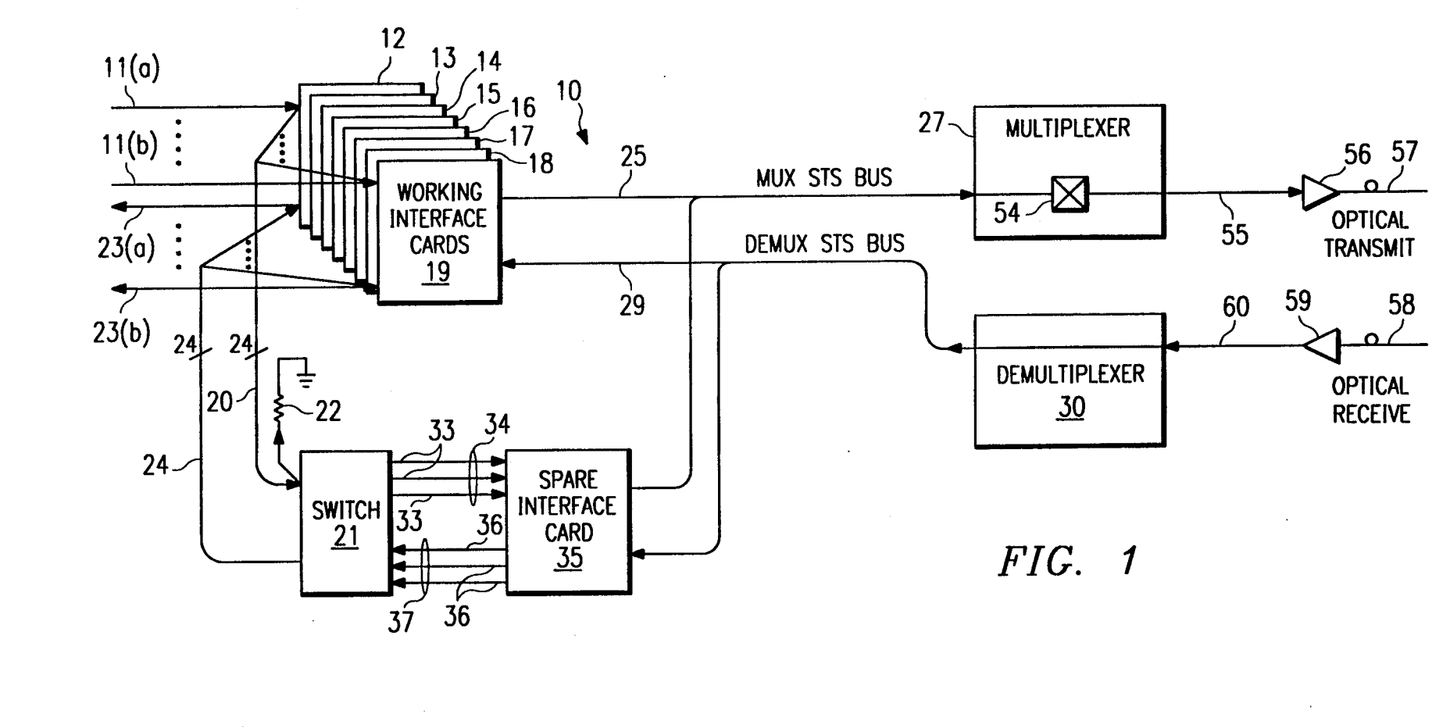
FIG. 1 is a high level electro-optical schematic diagram of a DS3/optical communications interface which may incorporate the invention.

In FIG. 1, an electro-optical telecommunications interface circuit is shown which may advantageously incorporate the invention. The interface circuit or system is indicated generally at 10.

An incoming electronic communication line 11 includes, in the illustrated embodiment, twenty-four DS3 communication channels. The incoming line 11 is connected to respective external input ports (described below) of a plurality of working interface cards 12-19. In the illustrated embodiment, three DS3 channels are connected to each of the cards 12-19. A transmission line 20, which for example may be constituted by 75-Ohm microstrip, connects the input ports of the working interface cards 12-19 with respective working circuit ports (described below) of a switch card 21. The working card port of the switch card 21 are, in the embodiment shown in FIG. 1, connected to respective groups of resistive terminations 22, one resistor per channel.

There is also an outgoing electronic communications line 23 having 24 DS3 channels. Groups of three of these DS3 channels are connected to respective external output ports (described below) of the working interface cards 12-19. A twenty-four channel transmission line 24, which for example may consist of 75-Ohm microstrip, is connected between each of the output ports of the working interface cards 12-19 and respective working circuit ports (described below) of the switch card 21.

The signals received on the incoming transmission line 11 are processed by the working interface cards 12-19 into digitized incoming electronic signals and, through internal outputs of the cards 12-19, put onto a digital bus 25. Bus 25 is connected to an input of a multiplexer 27. A digital bus 29 is connected between internal inputs of the working interface cards 12-19 and a demultiplexer 30. This digital line communicates outgoing demultiplexed digital electronic signals from the demultiplexer 30 to internal inputs of the working interface cards 12-19, which in turn transmit information in a DS3 format onto the main outgoing line 23.

The switch card 21 includes a plurality of spare circuit ports 33 which are connected by a three-channel transmission line 34 to respective inputs (described below) of a spare interface card 35. The spare interface card 35 has outputs (described below) connected to respective spare circuit ports 36 of the switchcard 21 through a three-channel transmission line 37. A spare card internal input is adaptable to receive outgoing internal digital electronic signals from STS bus 31, and generate corresponding outgoing electronic analog signals therefrom on its output port (described below). Spare card 35 is further capable of transmitting processed incoming electronic signals from its internal outputs onto bus 25 in response to receiving incoming analog electronic signals on its input port (described below).

Multiplexer 27 includes a cross connect circuit 54. The output of cross connect 54 of multiplexer 27 transmits a multiplexed electronic signal through a data path 55 to an electronic signal input of an optical transmission circuit 56. Optical signals are transmitted from the optical output of optical transmission circuit 56 on a set of fibers 57. Another set 58 of optical fibers is terminated by an optical input of an optical receiving circuit 59. An electronic signal output of optical receiver circuit 59 transmits a multiplexed electronic signal through a data path 60 to an input of the demultiplexer 30.

The illustrated interface circuit 10 multiplexes twenty-four DS3 inputs 11 into a 1.2 Gigabit fiber optic signal sent out on line 57, and demultiplexes a 1.2 Gigabit optical signal on fibers 58 into twenty-four DS3 communication channels 23.

Figure 2:
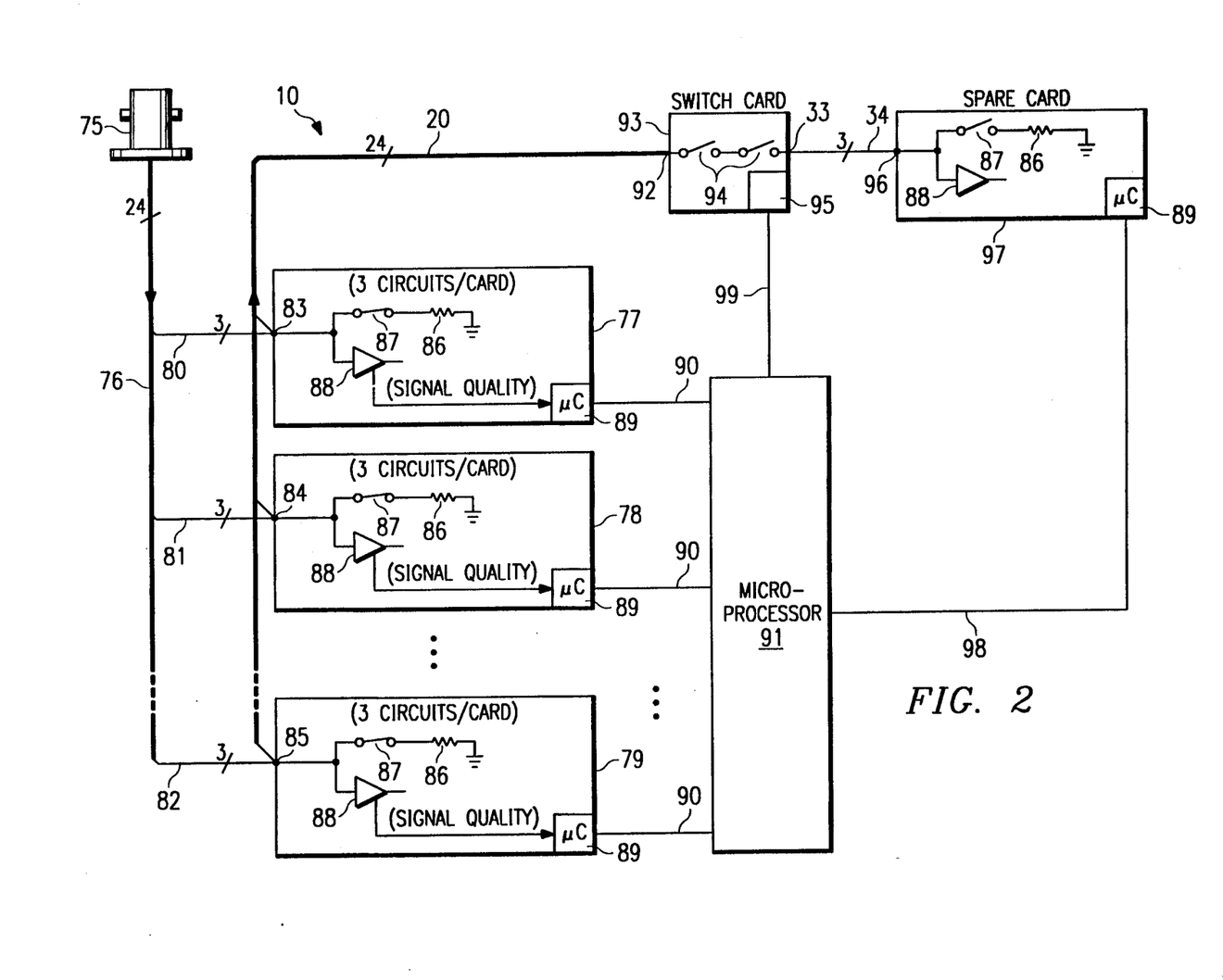
FIG. 2 is a high level electrical schematic diagram of the input side of a high-speed telecommunications interface circuit according to a first embodiment of the invention.
Figure 3:
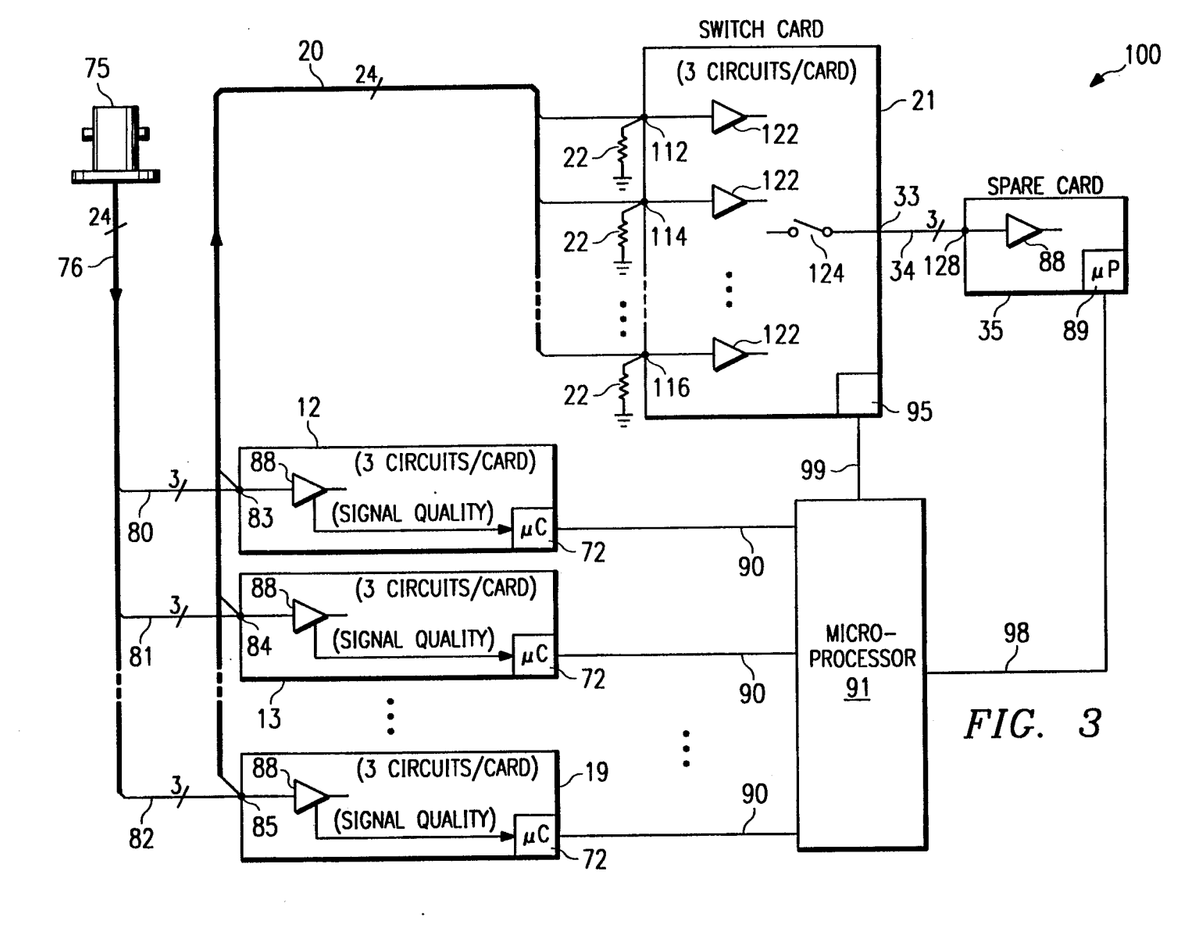
FIG. 3 is a high level electrical schematic diagram of the input side of a high-speed telecommunications interface circuit according to a second embodiment of the invention.

FIGS. 2 and 3 are alternative embodiments of a signal protection scheme for the input side of the high-speed telecommunications interface circuit 10 shown in FIG. 1.

In FIG. 2, a set of backplane connectors, symbolized by a single connector 75, terminates the incoming signal lines 11 (see FIG. 1), which for example may be 75-Ohm coaxial cables. In each of the illustrated embodiments, twenty-four such signal lines are connected to the backplane connectors 75, as used in the DS3 communications interface circuit 10. An incoming signal line 76 having a plurality of DS3 communication channels is terminated by the backplane connectors 75. Incoming line 76 may be, for example, 75-Ohm microstrip.

In the embodiment illustrated in FIG. 2, the circuit 10 has a plurality of working interface cards 77, 78, . . . 79. Only three such cards 16–20 are shown for the purpose of clarity, it being understood that the number of working cards may have a considerable variation based on the interface circuit design objectives. In the preferred embodiment, there are eight such cards 77–79. Respective branches 80, 81, . . . 82 of the incoming line 76 are connected to respective input ports 83, 84, . . . 85 of the working interface cards 77, 78, . . . 79. In a preferred embodiment, each of the input ports 83, 84, . . . 85 represents a set of input connections for three of the twenty-four channels of line 76. In a like manner, each device pictured on cards 77, 78, . . . 79 represents three devices, one for each of these channels. These circuit elements are shown only once for the purpose of clarity.

Each of the working cards 77–79 is substantially identical to the others in its interior circuitry. Each of the cards 77–79 has three DS3 interface receiver circuits, including three termination resistors represented by the single symbol 86. Each of the resistors 86 preferably has very little reactive component, and should have less than five nanohenries and less than or equal to three picofarads. Such resistors may be implemented by hybrid films printed on semiconductor substrates.

Each of the termination resistors is selectively connected to a respective input point 83, 84, . . . or 85 by a normally closed switch 87. Switch 87 can be a conventional telecommunication relay switch or a solid state switch such as a pin diode. The requirements of switches 87, and the remaining switches shown in the illustrated embodiments, are that they close and open within three to four millisecond and that the on impedance of the switches be less than or equal to about one to two Ohms.

The remainder of the receiver circuit on each of cards 77, 78, . . . 79 is represented by respective high input impedance amplifiers 88. The receiver circuits are complicated circuits having several functions. Each of the receiver circuits 88 converts a bipolar signal to a digital signal, isolates the input lines 80, 81, . . . or 82 from the outputs by a high-impedance amplifier, amplifies the received signal, and performs other functions, such as monitoring the quality of the signal received. An input of each amplifier 88 is connected to a respective input port 83, 84, . . . 85.

Each card 77, 78, . . . 79 is also provided with a microprocessor 89 used to receive data concerning circuit operations and to operate switches 87. Microcontrollers 89 of each of the cards are connected by control paths 90 to a central microprocessor 91. In one embodiment, microcontrollers 89 may be 60HC1 microcontrollers, while the central microprocessor 91 may be a Motorola 68000.

Each of the inputs 83, 84, . . . 85 of the working interface cards 77, 78, . . . 79 are connected to respective channels of the line 20 which runs from the inputs 83, 84, . . . 85 to a twenty-four channel working circuit port 92 of a switch card 93. A plurality of switches, here indicated by two such switches 94, are operable by microprocessor 91 through a logic decode circuit 95 to selectively connect three of the twenty-four channels within line 20 to a three-channel spare circuit port 33 of the switch card 93. The spare circuit port 33 of the switch card 93 is connected by the three-channel line 34 to a signal input 96 of a spare interface card 97. Once again showing a single symbol for a set of three such circuit elements, the three inputs 96 are connected to three termination resistors 86 by respective closed resistor switches 87. In this embodiment, switches 87 on the spare card 97 are never operated, and are present only because the circuitry on spare card 97 is almost identical to the circuitry on each of the working cards 77, 78, . . . 79. The inputs 96 are connected to respective ones of three receiver circuits 88, which are similar in their functions and construction to the receiver circuits of the working cards 77–79. An on-board microcontroller unit 89 operates the spare card switch 87 and receives data concerning the operation of the spare card 97. It is connected by a control line 98 to the main microprocessor 91. A control line 99 connects the logic decode circuit 95 on the switch card 93 to the main microprocessor 91.

The embodiment illustrated in FIG. 2 is a 1-for-8 protection scheme in which the three interface circuits on the spare card 97 may be used to substitute for the three such circuits on a selected one of the working interface cards 77, 78, . . . 79. However, the present invention is not limited to embodiments having three circuits per card or having 1-for-8 protection schemes. The invention is generally employable for any m for n protection scheme in which any number of interface circuits may be resident on a single working or spare card. Further, while the invention is described in conjunction with DS3 signals, the invention may be as easily employed with DS1, DS2 or STS signal protocols or any telecommunications system having a bit rate of less than or equal to approximately 52 Megahertz.

In operation of the embodiment shown in FIG. 2, the monitoring circuitry present in each of the receivers 88 periodically monitors the quality of the signal at the signal outputs of such receivers 88 for the working cards 77, 78, . . . 79 and for the spare card 97. . . To determine whether or not one of the working cards 77, 78, . . . 79 is malfunctioning, the microprocessor 91 will (a) sense a poor signal quality on (e.g.) card 78, (b) open switch 87 on card 78, and (c) operate switches 94 on switch card 93 to create a data path from input 84 to spare card input 96. One of the technical advantages of the invention is that this signal will normally be no better than the quality of the signal received on the selected one of the working card inputs ports 83, 84, ... 85. Preferably, to account for manufacturing variations, the resistive termination 86 on the spare card 97 is slightly mismatched to the impedance of the incoming transmission line to which it is connected, such that the signal received at the input 96 of the spare card 97 is slightly worse than the normal quality of the signal experienced by the working cards 12, 13, ... 19. Thus, if there is a signal malfunction external to the equipment, the signal will be worse at the spare card than it is at any of the working cards 12, 13, ... 19, and no switch over to spare card operation will occur. During normal operation, the signal will never appear "better" at the spare card 35 than it is at the compared one of the working cards 12, 13, ... 19. Only in the instance of a circuit malfunction on one of the cards 12, 13, ... 19 will a protection condition occur.

A principal advantage of the invention as shown in the embodiment in FIG. 2 is that there will be no loss of signal if a failure of one of the cards 77, 78, ... 79, 93 or 97 occurs. If the switch card 93 fails, the signal is still being received by each of the working cards 77, 78, ... 79. If one of the working cards 77, 78, ... 79 fails, it may be backed up by the spare card 97. The spare card 97 is not normally connected to the signal path, so a failure of it will not affect signal processing. The cards 77-79, 93 and 97 are conventionally sufficiently reliable that the chance of a double failure in the system is extremely remote. Thus, the reliability of the entire interface circuit 10 is enhanced.

Another protection scheme on the input side of a high-speed telecommunication circuit is illustrated in FIG. 3. This telecommunication circuit is indicated generally at 100. Like the scheme shown in FIG. 2, the interface circuit 100 employs a 1-for-8 protection scheme. A twenty-four channel input signal line 76 has groups of three channels 80, 81, ... 82 connected to respective input ports 83, 84, ... 85 of a plurality of working interface cards 12, 13, ... 19. Although three such interface cards 12, 13 and 19 are shown, the preferred embodiment employs eight such working interface cards, each having three separate interface receiver circuits 88 on them, here each represented by the high input impedance amplifier which is included within such circuits. In each of the cards 12, 13, ... 19, the inputs of the receiver circuits 88 are connected to a respective input port 83, 84, ... 85. Each card 12, 13, ... 19 also has an on-board microprocessor 72 which is operable to sense the operational state of the interface card on which it is resident, including circuitry for monitoring the quality of the signal. These on-board microprocessors 72 are connected by respective control lines 90 to a central microprocessor unit 91, which can for example be a Motorola 68000. Cards 12, 13, ... 19, however, have no resistive terminations on board or switches for selectively connecting them to the input ports 83, 84, ... 85, and therefore the programming of microprocessors 72 need not contain switching software corresponding to them.

The inputs 83, 84, ... 85 are connected by a twenty-four channel line 20 to a set of working circuit ports 112, 114, ... 116 of a switch card 21. There are twenty-four such input ports 112-116 organized into eight groups of three. Each group of three working circuit ports 112, 114, ... 116 has connected thereto three termination resistors 22, one for each channel, here indicated by a single symbol for each group of three such resistors. The resistors are selected to have an impedance which almost matches that of the respective channels of line 20. In a preferred embodiment in which the impedance characteristic of line 20 is 75 Ohms, resistors 22 are chosen to be 68 Ohms. The difference between these two values is accounted for at least in part by the capacitive loading of the switch card 21 itself. The twenty-four termination resistors 22 may, for example, be constituted by a resistive termination block manufactured by 3M, part No. 80-6105-1409.

Each of the switch card ports 112, 114, ... 116 is connected to the input of a high input impedance amplifier 122. A switching matrix, here indicated by a single switch symbol 124, selectively connects three of the outputs of the twenty-four high input impedance amplifiers 122 to a spare circuit port 33 of switch card 21. The spare circuit port 33 is in turn connected by a three-channel line 34 to an input 128 of a spare interface card 35. Spare card 35 has three interface receiver circuits (represented by the single symbol 88) that each include a high input impedance amplifier and signal quality monitoring circuitry.

The switch card 21 is provided with a logic decoding circuit 95, and the spare interface card 35 is provided with a microprocessor 89. Logic decoding circuit 95 is operable to sense the operational state of the switch card 21 and also to operate the switch matrix 124. Microprocessor 89 of spare card 35 is operable to sense the operational state of the spare card 35. A control line 98 connects the on-board microprocessor 89 of spare card 35 to the central microprocessor 91. A line 99 connects the logic decoding circuit 95 to the central microprocessor 91.

In the operation of this embodiment, the microprocessor 91 keeps track of the operational condition of each of the working interface cards 12, 13, ... 19 through the control links 90 to the on-board microprocessor units 89. The switch card 21 is operated such that the signal present at the input of a selected one of the working interface cards 12, 13. . . 19 is bridged to the input 128 of the spare card 35. The signal quality appearing on the selected one of the cards 12, 13. . . 19 is then compared to the signal quality at spare card 35. As in the embodiment shown in FIG. 2, the signal quality received at input 128 should be no better than, and preferably is slight worse than, the signal quality normally received on inputs 83, 84. . . or 85.

In the normal instance, the signal quality of the selected one of the working interface cards 12, 13. . . 19 will thus be better than the signal quality appearing on the spare card 35. Therefore, no switching condition is triggered. The working interface cards 12, 13. . . 19 are continuously polled for any malfunction. When a malfunction on one of the working interface cards 12, 13. . . 19 does appear, the signal quality monitored for the working interface card will be substantially worse than that on the spare card 35. In response to this, the switching matrix 124 permanently bridges the signal appearing at the input of the malfunctioning one of the cards 12, 13. . . 19 to the input 128 of the spare card 35. It can be said that the switching matrix 124 selectively creates a signal path from one of the working circuit inputs 112, 114. . . 116 to the port 33.

The high-impedance amplifiers 122 effectively terminate the channels of transmission line 20, so that the length of the transmission line 34 need not be a limiting factor. Further, since the resistive terminations 22 are connected to the working circuit input ports 112, 114, . . . 116 of the switch card 21, no such resistive terminations are necessary for the working cards 12, 13, . . . 19. The card resistor switches 87 associated with the embodiment shown in FIG. 2 are avoided in this manner.

The embodiment shown in FIG. 3 has an additional advantage over the one shown in FIG. 2 in that in FIG. 2, when the working cards 77, 78, . . . 79 are in operation, the transmission line 20 acts as a stub which distorts the signal and which makes the system return loss exceed specifications. Since the resistive terminations 22 in FIG. 3 are at the end of transmission line 20, no such distorting stub is presented to the incoming signal on line 76.

Optimally, in FIG. 3, the distance between the input connectors (working card inputs) 83, 84, . . . 85 and respective inputs of the high-impedance amplifiers 88 on the cards 12, 13, . . . 19 should be less than two inches for the frequencies disclosed. The connection should have a capacitance of less than five picofarads. Likewise, on switch card 21, the distance between input connectors (working circuit input ports) 112, 114, . . . 116 and the inputs of the respective high-impedance amplifiers 122 should be less than two inches for the frequencies disclosed, and should have capacitances of less than five picofarads. Because the resistors 22 and the high-impedance amplifiers 122 effectively terminate the transmission line 20 in any condition, the output transmission line 34 from the switch card 21 can be up to several feet long. The omission of resistor termination switches on the working cards 12-19 reduces the number of operations for the switch operating software, reduces the number of countable switching events, reduces component count and improves the transmission line termination.

Figure 4:
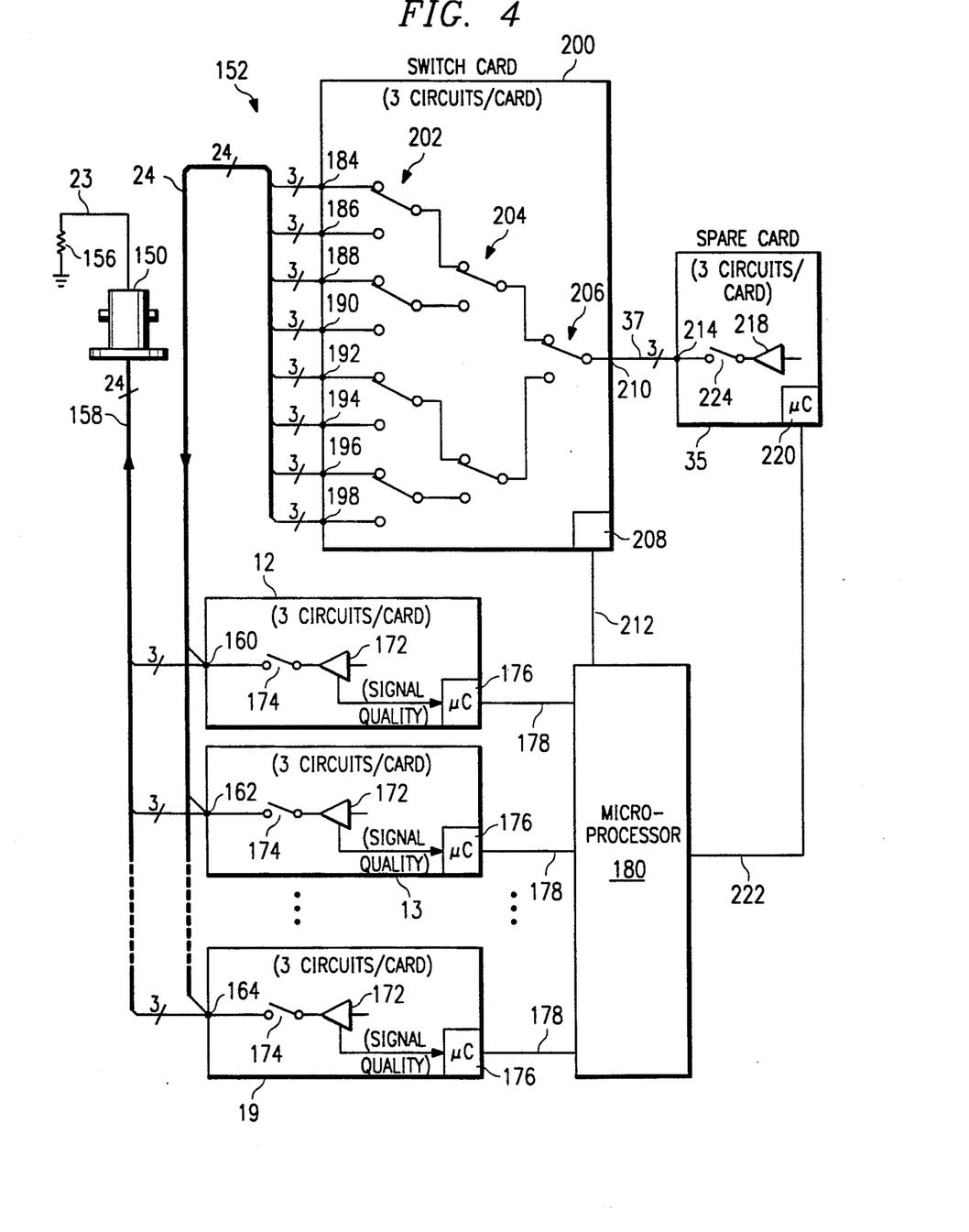
FIG. 4 is a high level electrical schematic diagram of the output side of a high-speed telecommunications interface circuit according to the invention.
Figure 5:
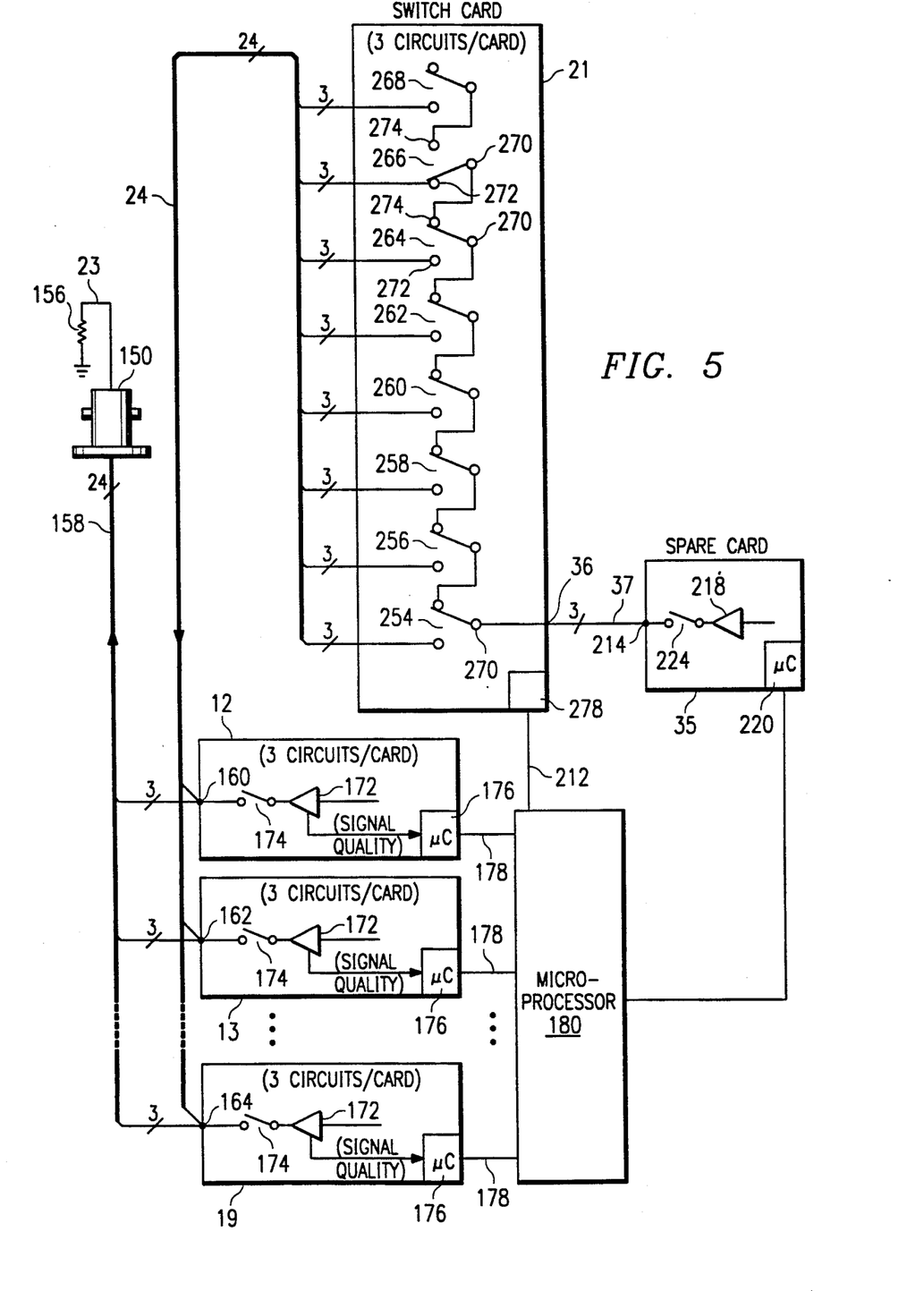
FIG. 5 is a high level electrical schematic diagram of the output side of a high-speed telecommunications interface circuit according to an embodiment of the invention which is alternative to that shown in FIG. 4.

FIGS. 4 and 5 are alternative embodiments of the output side of a high-speed telecommunication interface circuit, either of which may be used with either of the embodiments shown in FIGS. 2 and 3. In FIG. 4, a plurality of backplane connectors, here indicated by single symbol 150, connect the interface circuit indicated generally at 152 to a plurality of 75-Ohm coaxial cables 23. In the illustrated embodiment, there are twenty-four coaxial cables 23, each of which eventually terminates in a resistive termination schematically illustrated by the resistor symbol 156.

A twenty-four channel microstrip DS3 outgoing transmission line 158 terminates at the backplane connectors 193 and is connected to respective outputs 160, 162, . . . 164 of working interface cards 12, 13, ... 19. As in the input side circuits illustrated in FIGS. 2 and 3, the illustrated embodiment uses eight such cards 12-19, on which are preferably placed three interface output circuits per card. Each of the working interface cards 12-19 has three DS3 transmitter circuits 172, here indicated by a single amplifier symbol on each card. Circuits 172 are relatively complex, and include a digital-to-bipolar conversion circuit, an isolation circuit, signal quality monitoring circuitry, and line build-out circuitry to reduce the impedance variance that may otherwise occur in different external outgoing transmission lines 23.

The output of each transmitter circuit 172 is selectively connected to a respective transmitter output 160, 162, . . . 164 by a normally closed switch or relay 174. Each card further has an on-board microcontroller 176, such as a 60HC11, which senses the operating condition of the transmission circuit 172 and is operable to open and close the respective output switches or relays 174 on that card. Control lines 178 connect respective on-board microcontrollers 176 to a central microprocessor unit 180, which for example can be a Motorola 68000.

The on-board microcontrollers 72 or microprocessors 89 shown in FIGS. 2 and 3, respectively, can be the same as the on-board microprocessors 176 shown in FIGS. 4 and 5. Further, the central microprocessor 91 in FIG. 2 or microprocessor 110 in FIG. 3 can be the same unit as the central microprocessor 180 shown in FIGS. 4 and 5.

Each of the output ports 160, 162, . . . 164 of the working interface cards 166, 168, . . . 170 is connected to a twenty-four channel microstrip transmission line 24. The transmission line 24 is connected to twenty-four working circuit ports 184, 186, . . . 198 on a switch card 200. Each illustrated port 184-198 is actually a set of three such ports. It is to be understood that each of the electrical symbols on the switch card 200 is actually a set of three devices which connect or disconnect three respective transmission line channels.

Switch card 200 has a first bank of switches 202, a second bank of switches 204 and a third switch 206 which are operable by an on-board logic decoding circuitry 208 to connect a selected one of the working circuit ports 184-198 to a spare circuit port 210 of the switch card 200. The on-board logic decoding circuitry 208 is connected through a control line 212 to the central microprocessor 180. A three-channel transmission line 37 connects an output 214 of a spare interface card 35 to the spare circuit port 210 of the switch card 200.

Similar to the working interface cards 12, 13, . . . 19, the spare card 35 has a set of three transmitter circuits 218, each of which includes a high-impedance amplifier. The complex transmission circuits 218 further include a digital bipolar conversion circuit and line buildout circuitry. An on-board microprocessor 220 is connected through a control line 222 to the central microprocessor 180. On-board microprocessor 220 senses the operational state of the spare card 35, and is operable to close and open the normally open switch 224. Switch 224 is operable to close a path from the output of the transmission circuits 218 to the output 214 of the spare card.

In the operation of the output protection scheme shown in FIG. 4, one of the on-board microcontrollers 176 may sense a malfunction on one of the working interface cards 12, 13, . . . 19. Information concerning this malfunction is communicated through one of the communication lines 178 to the microprocessor 180. Microprocessor 180 then instructs the on-board microcontroller 176 of (e.g.) working interface card 13 to open. At the same time, instructions are sent to circuitry 208 and microcontroller 220 to close the normally opened switch 224 on spare card 35 and, by operation of the switches 202, 204 and 206, to create a communication path between (e.g.) working circuit port 186 and the spare circuit port 210 of the switch card 200.

A particularly preferred embodiment of an output protection scheme is shown in FIG. 5. The output protection circuitry is similar to that shown in FIG. 4, with the exception that the switch card 200 has been replaced with a switch card 21. The switch card 21 has a series-connected set of switches 254-268. Taking switch 264 as an example, each of the switches has an input terminal 270, and external output terminal 272, and a series connection terminal 274 that is connected to the input terminal 270 of the next switch. Each of the illustrated switches 254-268 actually represents three separate switches which service separate communication channels within the twenty-four channel transmission line 24. In the illustrated embodiment, the switches 254-268 are organized into eight banks of three switches apiece.

On-board logic decoding circuitry 278 is operable to control the positions of the actual or virtual blades of each of the switches 254-268, and is itself controlled through a communication line 212 by the central microprocessor 180. Each of the external output terminals 272 (actually three such terminals) is connected through working circuit ports (not shown) to a set of three channels from the transmission line 24. Each set of three channels is connected to a respective working interface card 12, 13, . . . or 19. A first switch 254 in the series or ladder of switches 254-268 has its input terminal 270 coupled to a spare circuit port 36 of the switch card 21. Port 36 is connected by a set of three communication channels 37 to the output 214 of the spare card 35.

In operation, logic decoding circuitry 278 of switch card 21 receives instructions from microprocessor 180 to actuate each of the switches 254, 256, . . . 268 to connect one of the actual or virtual blades of these switches to a selected external output terminal 272, while the remaining blades are switched to their respective series connection terminals 274. In this way, a single data path is created from a selected working circuit port of spare card 21, corresponding to one of the working cards 12, 13, . . . 19, to the spare circuit port 36 of the switch card 21. In FIG. 5, switch 266 has its actual or virtual blade connected from its input terminal 270 to its output terminal 272, while the remaining switches 254-264, 268 have their blades connecting their input terminals 270 to the series connection terminals 274.

At about the same time, the microprocessor 180 actuates switch 174 of the working interface card 13 to open and switch 224 of spare card 35 to close. In this way, the spare card 35 generates a DS3 transmission output signal instead of the working interface card 13.

The embodiment shown in FIG. 5 is preferred over that in FIG. 4 because the switching structure of card 200 shown in FIG. 4 is liable to cause errors in other channels. This is because switching paths of many working cards in the output protection scheme shown in FIG. 4 are changed when a spare card is electrically substituted into place for a selected one of the working cards. In contrast, in the protection scheme shown in FIG. 5, only the switch path to an affected working card is changed, and no others are affected.

In FIG. 4, each of the working cards 12, 13, . . . 19 is connected through respective output ports 184, 186, . . . 198 in the switch card 200, and further into the interior of the switching matrix formed by switches 202, 204 and 206 to varying distances. This forms transmission line stub lengths which change according to the configuration of the switches 202, 204 and 206. As this configuration changes, the stub lengths associated with the cards 12, 13, . . . 19 change, causing variable degradation of the signal. This problem is avoided with the embodiment shown in FIG. 5, in which the transmission line stubs associated with each of the spare cards 12, 13, . . . 19 are of uniform length, in essence terminating at the working circuit output ports of the switch card 21.

As indicated by the identity of the reference characters accorded the working, spare and switch cards in the preferred embodiments shown in FIGS. 3 and 5, the input side protection circuitry shown in FIGS. 2 or 3 and the output side protection circuitry shown in FIGS. 4 or 5 are preferably fabricated onto a single set of cards. That is, all of the working interface cards have both data receivers and transmitters, as does the spare card. Both the illustrated input and output switching circuitry may be placed on a single switch card. While the input and output protection schemes described may be useful for communication protocols using shaped bipolar signals and having a bit rate was less than or equal to 55 Megahertz, they are particularly useful for DS3 and STS communications protocols, with their respective bit rates of about 45 and about 51 Megahertz, respectively.

In summary, a novel input and output processing scheme has been shown and described for high-speed telecommunication interface circuits. On the receiving side of the interface circuits, the signal inputs of the working interface cards are connected through a switch card to a spare card, allowing the bridging of a selected one of the input signals to the input of the spare card. The signal quality appearing at the spare card and a selected one of the working interface cards is then compared to determine whether or not the system should be operated to protect the input signal. The scheme allows for the insertion of a spare card for a failed card without affecting the communication path to the remaining working interface cards. It also decreases the number of switches or switching events that the central microprocessor has to make in order to change out the affected working card.

While illustrated embodiments of the invention have been shown and described in the above-detailed description, the invention is not limited thereto but only by the scope and spirit of the appended claims.

What is claimed is:

1. Electronic communications receiving circuitry, comprising:

a plurality of working telecommunications receivers, each having an input, said inputs connected to respective external communication channels;

a switch circuit having a plurality of working circuit ports and at least one spare circuit port, said working circuit ports of said switch circuit connected to respective inputs of said receivers, said switch circuit having a plurality of high input impedance amplifiers each with an input and an output;

inputs of said amplifiers connected to respective ones of said working circuit ports of said switch circuit, said switch circuit operable to create a data path between the output of a selected one of said amplifiers and said spare circuit port of said switch circuit;

a plurality of resistive terminations connected to respective ones of said working circuit ports of said switch circuit; and at least one spare receiver, an input of said spare receiver connected to said spare circuit port of said switch circuit.

2. Telecommunications receiving circuitry, comprising:

a plurality of input ports;

a plurality of working telecommunications receivers organized into groups, each working receiver including an input and a termination resistor, a respective transmission line connecting said input of a respective one of said working receivers to a respective one of said input ports, for each working receiver, a resistor switch operable to selectively connect said termination resistor of said working receiver to said input of said working receiver;

for each group of working receivers, a switching circuit having a plurality of working circuit ports connected to inputs of respective ones of said receivers in said group and at least one spare circuit port, a plurality of switches of said switching circuit operable to connect a selected one of said working circuit ports of said switching circuit to said spare circuit port thereof;

for each group of receivers, a spare receiver having an input and a termination resistor connected to said input, said input of said spare card connected to said spare circuit port of said switching circuit;

means, coupled to said group of working receivers, for ascertaining a signal of a predetermined quality in one of said group of working receivers; and means, responsive to said means for ascertaining, for openings said termination resistor switch in said one of said group of working receivers.

3. Electronic communications transmitting circuitry, comprising:

an output port;

a plurality of working transmitters, each working transmitter including an output and an output circuit, said output circuit connected to said output port, a normally closed switch of said working transmitter operable to connect said output circuit to said output of said working transmitter, said transmitters organized into at least one group;

for each group of working transmitters, a switching circuit having a plurality of first ports and a second port, each of said first ports of said switching circuit connected to a respective working transmitter in said group, a plurality of switches of said switching circuit operable to connect a selected one of said first ports to said second port; and for each group, a spare transmitter having an output, an output circuit and a normally open switch, said output of said spare transmitter connected to said second port of said switching circuit, said switch of said spare transmitter operable to connect said output circuit of said spare transmitter to said output of said spare transmitter, and a switch of a malfunctioning transmitter of said working transmitter operable to disconnect said output circuit of said malfunctioning transmitter from said output of said malfunctioning transmitter, and said switching circuit operable to connect a first port of said switching circuit corresponding to said malfunctioning transmitter to said second port of said switching circuit, all in response to detecting a malfunction in said malfunctioning transmitter.

4. Telecommunications transmitting circuitry, comprising:

an output port;

a plurality of working transmitters organized into at least one group, each working transmitters including an output and an output circuit, said output circuit connected to said output port, a normally closed switch operable to connect said output circuit to said output of said working transmitter;

for each group of working transmitters, a switching circuit having a plurality of first ports and a second port, each of said first ports connected to a respective output of a working transmitter in said group;

means coupled to said group of working transmitters, for ascertaining a signal of a predetermined quality defining a malfunction in one of said working transmitters;

a plurality of series switches of said switching circuit, each said series switch of said switching circuit having an input terminal, an eternal output terminal, a series output terminal;

for each said series switch except a last series switch, said series output terminal of said series switch connected to an input terminal of a next series switch, said external output terminal of each said series switch connected to a respective first port circuit, said input terminal of a first series switch of said series switches connected to said second port, said series switches operable to create a communication path from said input terminal of said first switch through a number of said series switches to an external output terminal of a series switch associated with a selected one of said working transmitter circuits; and for each group, a spare transmitter having an output, an output circuit and a normally open switch, said output of said spare transmitter connected to said second port of said switching circuit, said switch of said spare transmitter operable to connect said output circuit of said spare transmitter to said output thereof, said switch of a malfunctioning transmitter of said working transmitters operable to disconnect said output circuit thereof from said output thereof, and said switching circuit operable to connect a first port corresponding to said malfunctioning transmitter to said second port of said switching circuit, all in response to detecting a malfunction in said one of said transmitters.

5. High-speed telecommunications data transmission and reception equipment, comprising:

an input/output port;

a plurality of working data interface cards each having a group of transmitter circuits and a group of receiver circuits, each of said receiver circuits having an input, a high input impedance amplifier coupled to said input, and an output, each of said transmitter circuits having an output, an output circuit, and a normally closed output switch operable to connect said output circuit to said output, said inputs of said receiver circuits and said outputs of said transmitter circuits connected to said input/output port;

a switch card having a plurality of input switch circuits equal in number to said number of receiver circuits on one of said working cards and a plurality of output switch circuits equal in number to said number of transmitter circuits on one of said working cards, said switch card having a plurality of first ports and second ports both equal in number to said plurality of working cards, each of said first ports connected to a respective group of receiver circuits, each of said second ports connected to a respective group of transmitter circuits;

said switch card having a third port and a fourth port, said switch card operable to connect a selected one of said first ports to said third port, said switch card further operable to connect a selected one of said second ports corresponding to said selected one of said first ports to said fourth port; and a spare data interface card having a group of receiver circuits and a group of transmitter circuits, each of said receiver circuits on said spare card having an input, a high-impedance amplifier coupled to said input, and an output, each of said transmitter circuits on said spare card having an output, an output circuit, and a normally open output switch operable to connect said output circuit to said output, said inputs of said receiver circuits on said spare card connected to said third port of said switch card, said outputs of said transmitter circuits on said spare card connected to said fourth port of said switch card.

6. The equipment of claim 5, and further comprising, for each of said receiver circuits, a termination resistor and a resistor switch operable to connect said termination resistor to said input of said receiver.

7. The equipment of claim 5, and further comprising, for each of said first ports of said switch card, a plurality of communication line channels connecting each said first port to each said respective receiver circuit group, and, for each of said channels, a termination resistor connected to said channel at said first port.

8. The equipment of claim 6, wherein said switch card further comprises a plurality of series switches organized into groups, each series switch having an input terminal, an external output terminal and a series output terminal, a first group of said series switches having their input terminals coupled to said fourth port of said switch card, all but a last group of said series switches having their series output terminals connected to the input terminals of respective series switches in the next group, external output terminals in any one group of said series switches connected to a respective one of said second ports of said switch card.

9. Interface circuitry for receiving a plurality of incoming telecommunications channels, comprising:
a plurality of working receivers each having an input connected to a respective one of said incoming channels;
a switching circuit having a plurality of working circuit ports each connected to an input of a respective one of said working receivers, and a spare circuit port, said switching circuit operable to create a data path between a selected one of said working circuit ports and said spare circuit port; and
a spare receiver having an input connected to said spare circuit port of said switching circuit.

10. The interface circuitry of claim 9, and further comprising, for each receiver, a termination resistor, a resistor switch operable to connect said termination resistor to said input of said receiver.

11. The interface circuitry of claim 9, and further comprising a plurality of transmission channels connecting inputs of said working receivers to said working circuit ports of said switching circuit, a respective resistive termination connected to each transmission channel at each of said working circuit ports of said switching circuit.

12. A high-speed electronic communications interface, comprising:
a plurality of working interface cards, a group of receivers disposed on each of said cards, each of said receivers having an input, a plurality of incoming communication channels connected to respective ones of said inputs of said receivers on said working cards;
a switch card having a plurality of switching circuits equal in number to the number of receivers on each working card, a plurality of multiple-channel working circuit ports of said switch card connected to respective ones of said working cards, said switch card having a spare card port with a number of channels equal in number to the number of receivers on one working card, said switching circuits operable to create a data path from a selected one of said working circuit ports to said spare card port; and
a spare card having a plurality of receivers equal in number to the number of receivers on one of said working cards, inputs of said receivers on said spare card connected to said spare card port of said switch card.

13. An electro-optical telecommunications interface, comprising:
a plurality of working interface circuits each having an external signal input, an external signal output, an internal signal output, and an internal signal input, processing circuitry of each of said interface circuits coupled to said external signal input and said internal signal output for transforming an incoming electronic communications signal received on said external input thereof into a processed incoming electronic signal output on said internal output thereof, said processing circuitry further coupled to said external signal output and said internal signals input for generating an outgoing electronic communications signal on said external output of said working interface circuit responsive to receiving an internal outgoing electronic signal on said internal input thereof;
means, coupled to said processing circuitry, for ascertaining a signal of a predetermined quality defining a malfunction in each of said working interface circuits;
for each of a group of said working interface circuits, a switching circuit having a plurality of first ports connected to said external inputs of respective ones of said working interface circuits, a plurality of second ports connected to external outputs of respective ones of said working interface circuits, at least one third port and at least one fourth port, said switching circuit operable to couple a selected one of said first ports to said third port, and to connect a selected on of said second ports to said fourth port, responsive to sensing a malfunction in the ascertaining means of a working interface circuit corresponding to said selected ones of said first and second ports;
at least one spare interface circuit having an external signal input, an external signal output, an internal signal output, and an internal signal input, processing circuitry of said spare interface circuit coupled to said eternal signal input thereof and said internal signal output thereof for transforming an incoming electronic communications signal received on said eternal input of said spare interface circuit into a processed incoming electronic signal output on said internal output thereof, said processing circuitry further coupled to said external signal output and said internal signal input for generating an outgoing electronic communications signal on said external output thereof responsive to receiving an internal outgoing electronic signal on said internal input thereof, said external signal input of said spare circuit connected to said third port of said switching circuit, said external signal output of said spare interface circuit connected to said fourth port of said switching circuit;

a multiplexer having an input coupled to said internal outputs of said working interface circuits and said spare interface circuit, an output of said multiplexer transmitting a multiplexed electronic signal responsive to said multiplexer receiving processed incoming electronic signals on its input;

a demultiplexer having an input, outputs of said demultiplexer coupled to said internal inputs of said working interface circuits and said spare interface circuit for transmitting internal outgoing electronic signals responsive to said input of said demultiplexer receiving a multiplexed outgoing electronic signal;

an optical transmission circuit having an electronic signal input coupled to said output of said multiplexer, an optical signal output of said optical transmission circuit transmitting an optical signal responsive to said electronic signal input receiving said multiplexed electronic signal; and an optical receiver circuit having an optical signal input, an electronic signal output coupled to said input of said demultiplexer, said optical receiver circuit transmitting a multiplexed outgoing electronic signal responsive to said optical signal input receiving an optical signal.

14. A method of protecting a data communications link terminating in a plurality of working receiver circuits from failure of one of said working receiver circuits, comprising the steps of:

providing a switch circuit having a plurality of working circuit ports connected to respective ones of inputs of the working receiver circuits and having a spare circuit port;

connecting the input of a spare receiver circuit to the spare circuit port of the switch circuit;

resistively terminating respective inputs of operational ones of the working receiver circuits;

opening a normally closed switch between a termination resistor and an input of a nonoperational receiver circuit;

closing a normally open switch between a termination resistor and the input of the spare receiver circuit; and creating a data path within the switch circuit between a working circuit port connected to the input of the nonoperational working receiver circuit and the spare circuit port of the switch circuit, to thereby substitute the spare receiver circuit for the nonoperational working receiver circuit.

15. A method of protecting a data communications link terminating in a plurality of working receiver circuits from failure of one of said working receiver circuits, comprising the steps of:

providing a switch circuit having a plurality of working circuit ports connected to respective ones of inputs of the working receiver circuits, and a spare circuit port;

connecting an input of a spare receiver circuit to the spare circuit port of the switch circuit;

resistively terminating each of the working circuit ports of the switch circuit;

connecting a high impedance to each of the working circuit ports of the switch circuit; and creating a data path within the switch circuit between a high impedance connected to a working circuit port connected to the input of a nonoperational working receiver circuit and the spare circuit port of the switch circuit, to thereby substitute the spare receiver circuit for the nonoperational working receiver circuit.

* * * * *

UNITED STATES PATENT AND TRADEMARK OFFICE
CERTIFICATE OF CORRECTION

PATENT NO. : 5,321,394
DATED : June 14, 1994
INVENTOR(S) : Carlton, et al.

It is certified that error appears in the above-identified patent and that said Letters Patent is hereby corrected as shown below:

Column 2, line 39, after "problems associated", delete "wit" and insert --with--.

Column 4, line 56, after "ports 36 of the", delete "switchcard" and insert --switch card--.

Column 4, line 59, after "STS bus", delete "31", and insert --29--.

Column 5, line 31, after "such cards", delete "16-20", and insert --77-79.--.

Column 5, line 61, delete "millisecond" and insert --milliseconds--.

Column 7, line 4, delete "inputs" and insert --input--.

Column 8, line 48, delete "slight" and insert --slightly--.

Column 9, line 50, after "nectors", delete "193, and insert --150--.

Column 11, line 28, delete "spare" and insert --switch--.

Column 12, line 8, after "bit rate", delete "was".

Column 16, line 44, delete "on" and insert --one--.

UNITED STATES PATENT AND TRADEMARK OFFICE
CERTIFICATE OF CORRECTION

PATENT NO. : 5,321,394
DATED : June 14, 1994
INVENTOR(S) : Carlton, et al.

It is certified that error appears in the above-indentified patent and that said Letters Patent is hereby corrected as shown below:

Column 16, line 53, delete "eternal" and insert --external--.

Signed and Sealed this

Second Day of May, 1995

Attest:

BRUCE LEHMAN

Attesting Officer

Commissioner of Patents and Trademarks